United States Patent
Uchino et al.

(10) Patent No.: US 9,549,401 B2
(45) Date of Patent: Jan. 17, 2017

(54) MOBILE COMMUNICATION METHOD AND MOBILE STATION

(71) Applicant: NTT DOCOMO, INC., Tokyo (JP)

(72) Inventors: Tooru Uchino, Tokyo (JP); Sadayuki Abeta, Tokyo (JP); Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 9 days.

(21) Appl. No.: 14/420,907

(22) PCT Filed: Aug. 19, 2013

(86) PCT No.: PCT/JP2013/072049
§ 371 (c)(1),
(2) Date: Feb. 11, 2015

(87) PCT Pub. No.: WO2014/034453
PCT Pub. Date: Mar. 6, 2014

(65) Prior Publication Data
US 2015/0208393 A1 Jul. 23, 2015

(30) Foreign Application Priority Data
Aug. 29, 2012 (JP) .................................. 2012-188687

(51) Int. Cl.
*H04W 4/00* (2009.01)
*H04W 72/04* (2009.01)
(Continued)

(52) U.S. Cl.
CPC ........ *H04W 72/042* (2013.01); *H04L 61/2046* (2013.01); *H04W 8/26* (2013.01);
(Continued)

(58) Field of Classification Search
None
See application file for complete search history.

(56) References Cited

U.S. PATENT DOCUMENTS

2010/0035622 A1 2/2010 Ito et al.
2011/0299483 A1 12/2011 Wu
(Continued)

FOREIGN PATENT DOCUMENTS

JP 2010-41652 A 2/2010
WO 2010/082285 A2 7/2010

OTHER PUBLICATIONS

NTT DOCOMO, INC.; "Requirements, Candidate Solutions & Technology Roadmap for LTE Rel-12 Onward;" 3GPP Workshop on Release 12 and onwards, RWS-120010; Ljubljana, Slovenia; Jun. 11-12, 2012 (27 pages).

(Continued)

*Primary Examiner* — Michael J Moore, Jr.
(74) *Attorney, Agent, or Firm* — Osha Liang LLP (57) ABSTRACT

A mobile communication method includes the steps of transmitting a first control signal including an identifier different from a C-RNTI to the mobile station UE#A through a PDCCH by a radio base station PhNB#10 managing a cell #10 formed by linking multiple small cells, transmitting a second control signal including an identifier to the mobile station UE through a PDCCH by a radio base station eNB#1 managing a cell #1 having a coverage area overlapping with a coverage area of the cell #10, and regarding the first control signal as valid by the mobile station UE#A, when it determines that the identifier included in the first control signal and the identifier included in the second control signal match each other.

12 Claims, 8 Drawing Sheets

(51) Int. Cl.
*H04W 8/26* (2009.01)
*H04W 16/32* (2009.01)
*H04L 29/12* (2006.01)

(52) U.S. Cl.
CPC ...... *H04L 61/2038* (2013.01); *H04L 61/6022* (2013.01); *H04W 16/32* (2013.01)

(56) References Cited

U.S. PATENT DOCUMENTS

| | | | |
|---|---|---|---|
| 2012/0176983 A1 | 7/2012 | Iwamura et al. | |
| 2012/0230288 A1* | 9/2012 | Suh ....................... | H04W 99/00 370/329 |
| 2013/0308475 A1* | 11/2013 | Celebi ............... | H04W 72/1231 370/252 |
| 2015/0133124 A1* | 5/2015 | Lim ....................... | H04W 36/04 455/436 |
| 2015/0350926 A1* | 12/2015 | Uchiyama .............. | H04M 11/00 455/418 |
| 2016/0044651 A1* | 2/2016 | Lu .................... | H04W 72/0406 370/329 |

OTHER PUBLICATIONS

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11);" Jun. 2012 (201 pages).
Ericsson; "LTE Release 12 and Beyond;" 3GPP RAN WS on Rel-12 and onwards, RWS-120003; Ljubljana, Slovenia; Jun. 11-12, 2012 (23 pages).
Written Opinion for corresponding International Application No. PCT/JP2013/072049; mailed Sep. 17, 2013 (3 pages).
International Search Report for corresponding International Application No. PCT/JP2013/072049, mailed Sep. 17, 2013 (2 pages).
Extended European Search Report issued in the counterpart European Patent Application No. 13834009.6, mailed Mar. 10, 2016 (7 pages).

* cited by examiner

Prior Art

FIG. 9

Prior Art

MOBILE COMMUNICATION METHOD AND MOBILE STATION

TECHNICAL FIELD

The present invention relates to a mobile communication method and a mobile station.

BACKGROUND ART

Figure 6:
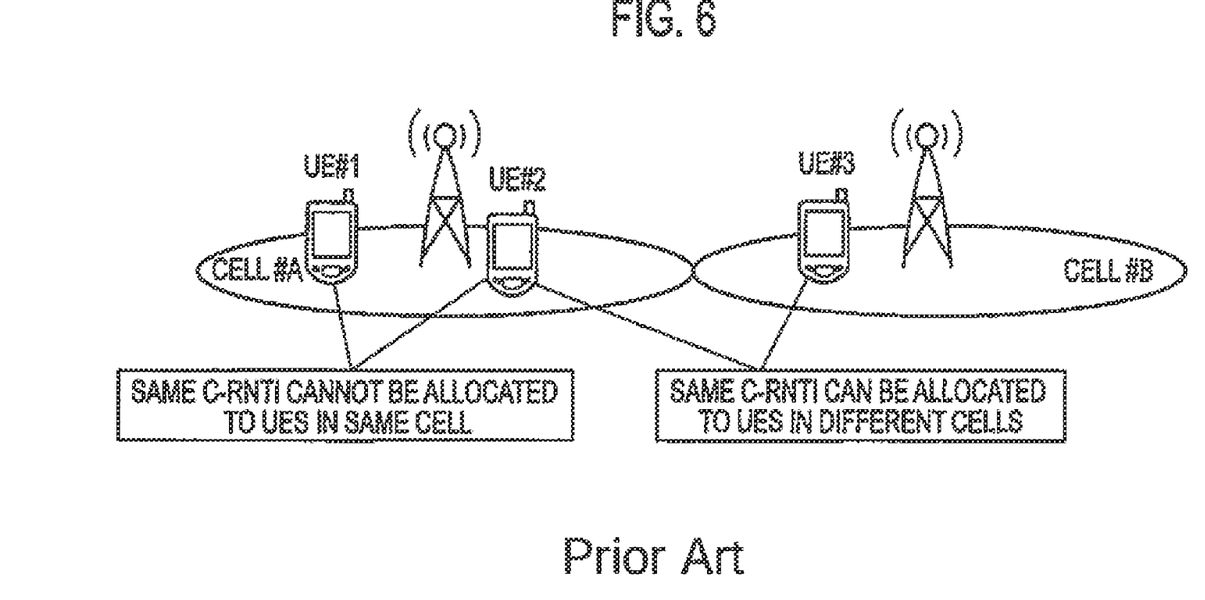
FIG. 6 is a diagram for illustrating a conventional technology.

In LTE (Long Term Evolution), a radio base station eNB is configured to transmit/receive data to and from a mobile station UE performing communications in a cell under the control thereof, with a C-RNTI (Cell-Radio Network Temporary Identify) allocated to the mobile station UE as illustrated in FIG. 6 (see, non-patent document 1).

The C-RNTI is allocated on a cell-by-cell basis. In LTE, as illustrated in FIG. 6, a same C-RNTI cannot be allocated to a mobile station UE#1 and a mobile station UE#2 which perform communications in a same cell #A, and a same C-RNTI can be allocated to a mobile station UE#1 (or a mobile station UE#2) and a mobile station UE#3 which perform communications in different cells #A/#B.

Here, the C-RNTI is allocated in "Contention based RA (Random Access) Procedure" or a handover procedure.

In addition, the radio base station eNB is configured to assign resources for transmitting downlink data or uplink data by using the C-RNTI allocated to the mobile station UE.

Meanwhile, in the "Rel-12 workshop" of the 3GPP, many proposals on "Small cell enhancement" have been made as topics of FRA (Future Radio Access).

In such proposals, a concept of "Phantom cell" has been discussed.

Figure 7:
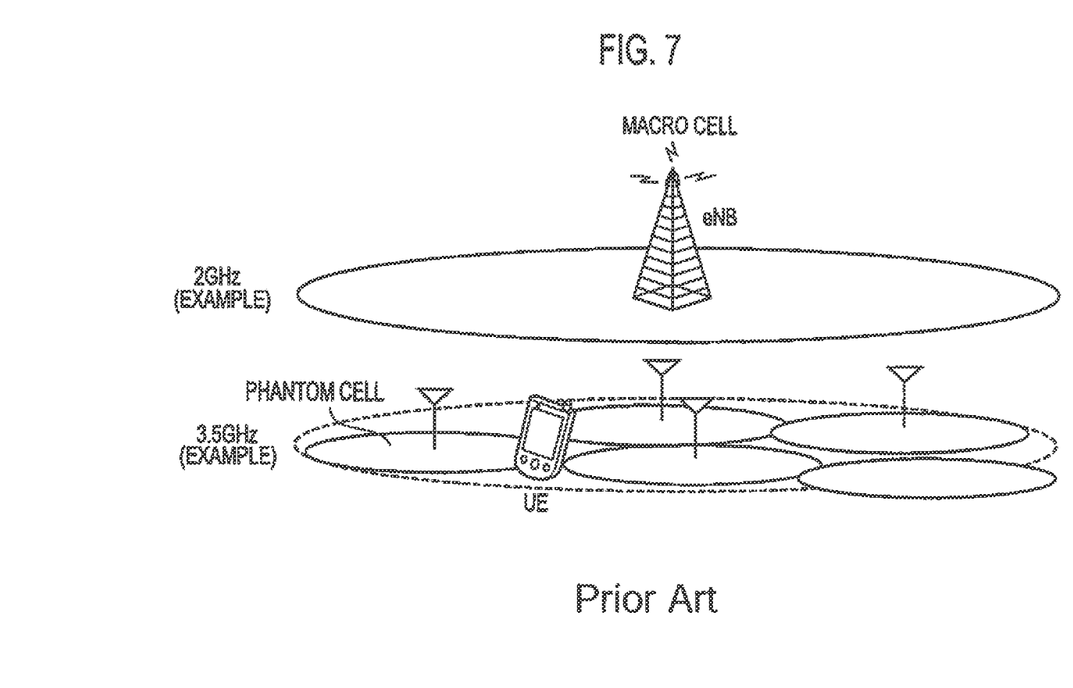
FIG. 7 is a diagram for illustrating the conventional technology.

As illustrated in FIG. 7, unlike a conventional macro cell, a phantom cell can cover a wider area by linking many "small cells" to form one large cell.

PRIOR ART DOCUMENT

Non-Patent Document

Non-patent document 1: 3GPP TS36.300

SUMMARY OF THE INVENTION

Figure 8:
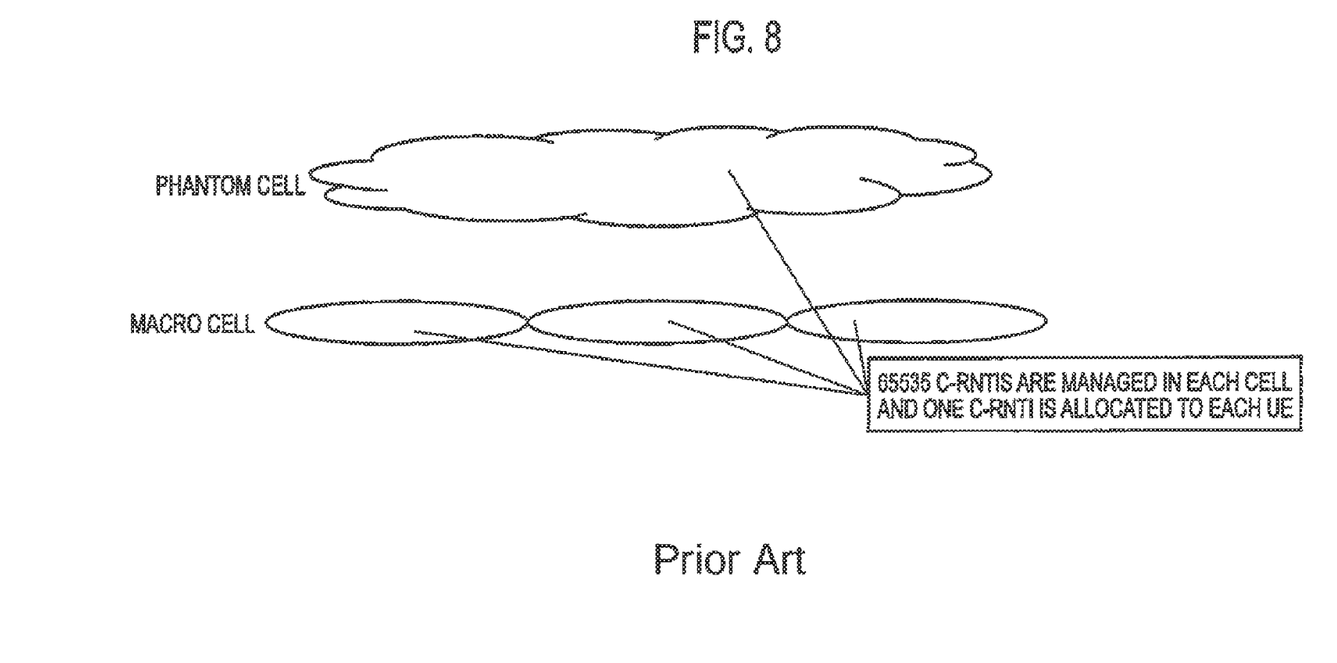
FIG. 8 is a diagram for illustrating the conventional technology.

However, as illustrated in FIG. 8, 65535 C-RNTIs are managed in each cell (a macro cell and a phantom cell), and one C-RNTI has to be allocated to each mobile station UE.

Here, when the coverage area of the phantom cell becomes wider, the number of mobile stations UE performing communications in the phantom cell increases. Accordingly, envisaged is a problem of causing a case in which the phantom cell may run out of C-RNTIs allocatable to the mobile stations UE.

Figure 9:
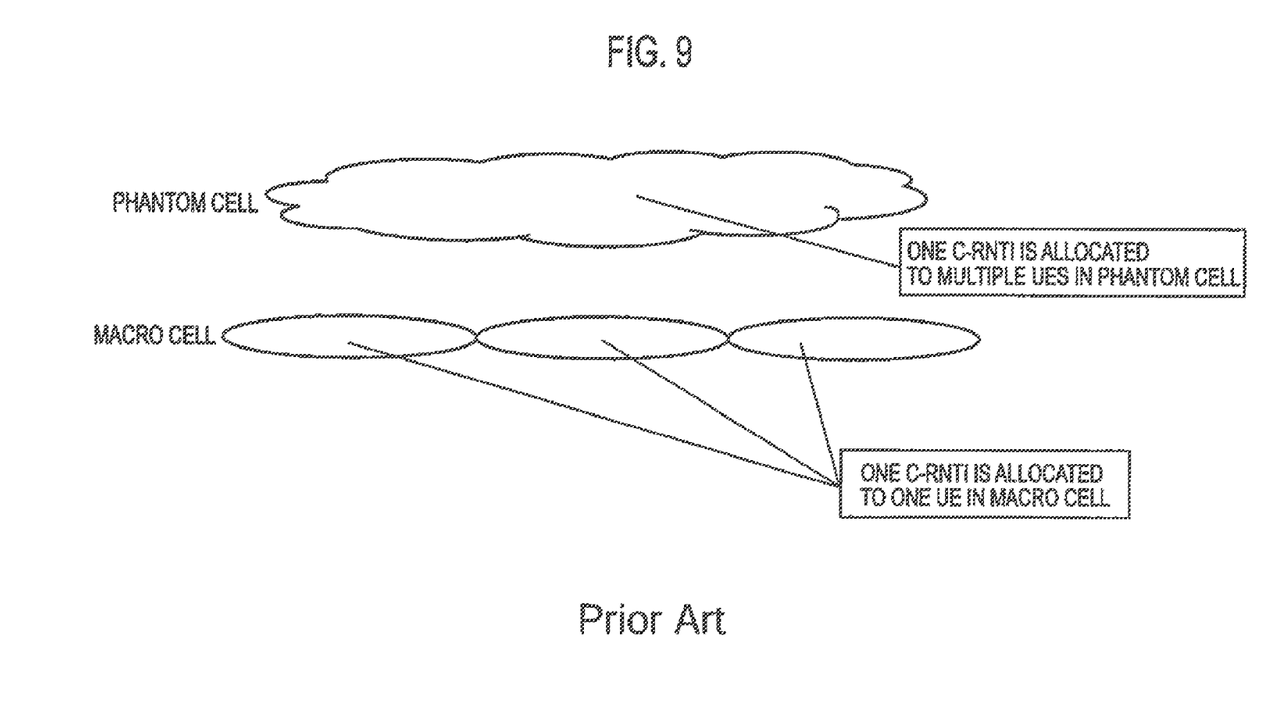
FIG. 9 is a diagram for illustrating the conventional technology.

In a conceivable operation for solving the above-described problem, as illustrated in FIG. 9, one C-RNTI is allocated to each mobile station UE in a macro cell, while one C-RNTI is allocated to multiple mobile stations UE in a phantom cell (in other words, one C-RNTI is shared between the multiple mobile stations UE).

However, execution of the above-described operation entails a problem that mobile stations UE to which the same C-RNTI is allocated in the same cell may collide with each other. Here, when such a collision occurs, a mobile station UE which is not intended by the radio base station eNB may wrongly receive allocation information for a correct mobile station UE.

For this reason, the present invention is made in view of the above-described problem. Accordingly, an objective of the present invention is to provide a mobile communication method and a mobile station capable of, even when a same C-RNTI is allocated to multiple mobile stations UE#A to UE#D in a phantom cell, avoiding a collision between the mobile stations UE#A to UE#D to which the same C-RNTI is allocated.

A first feature of the present invention is summarized as a mobile communication method, including the steps of: transmitting a first control signal including an identifier different from a cell-specific identifier to a mobile station through a physical downlink control channel by a first radio base station managing a phantom cell formed by linking multiple small cells; transmitting a second control signal including an identifier to the mobile station through a physical downlink control channel by a second radio base station managing a macro cell having a coverage area overlapping with a coverage area of the phantom cell; and regarding the first control signal as valid by the mobile station, when the mobile station determines that the identifier included in the first control signal and the identifier included in the second control signal match each other.

A second feature of the present invention is summarized as a mobile station capable of communicating with a first radio base station managing a phantom cell formed by linking multiple small cells and a second radio base station managing a macro cell having a coverage area overlapping with a coverage area of the phantom cell, the mobile station including: a reception unit configured to receive a first control signal including an identifier different from a cell-specific identifier from the first radio base station through a physical downlink control channel and receive a second control signal including an identifier from the second radio base station through a physical downlink control channel; and a determination unit configured to regard the first control signal as valid when determining that the identifier included in the first control signal and the identifier included in the second control signal match each other.

DETAILED DESCRIPTION (Mobile communication system according to the first embodiment of the present invention)

A mobile communication system according to a first embodiment of the present invention will be described with reference to FIGS. 1 to 5.

Figure 1:
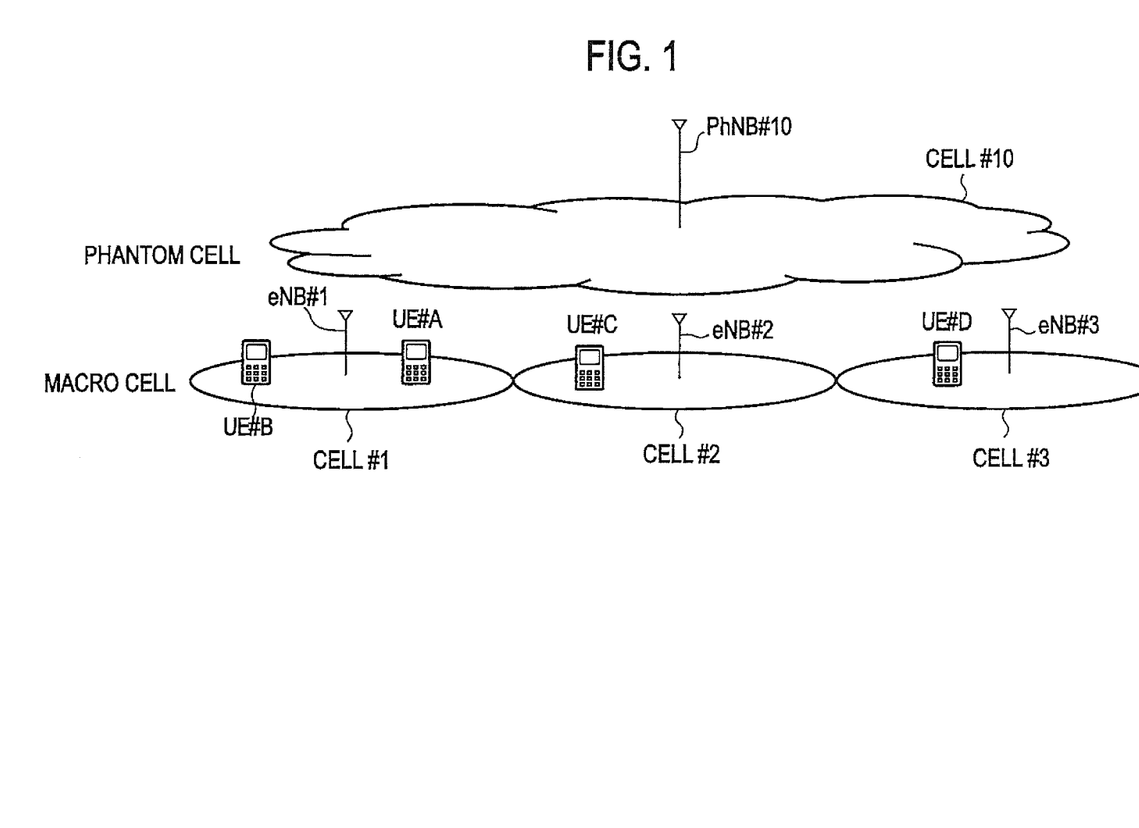
FIG. 1 is an entire configuration diagram of a mobile communication system according to a first embodiment of the present invention.

As illustrated in FIG. 1, a mobile communication system according to the present embodiment is an LTE mobile communication system, which includes a radio base station PhNB#10 configured to manage a cell #10, a radio base station eNB#1 configured to manage a cell #1, a radio base station eNB#2 configured to manage a cell #2, and a radio base station eNB#3 configured to manage a cell #3.

Here, the cell #10 is a phantom cell formed by linking multiple small cells and the cells #1 to #3 are macro cells.

As illustrated in FIG. 1, a coverage area of the cell #10 and coverage areas of the cells #1 to #3 are deployed to at least partially overlap each other.

Figure 2:
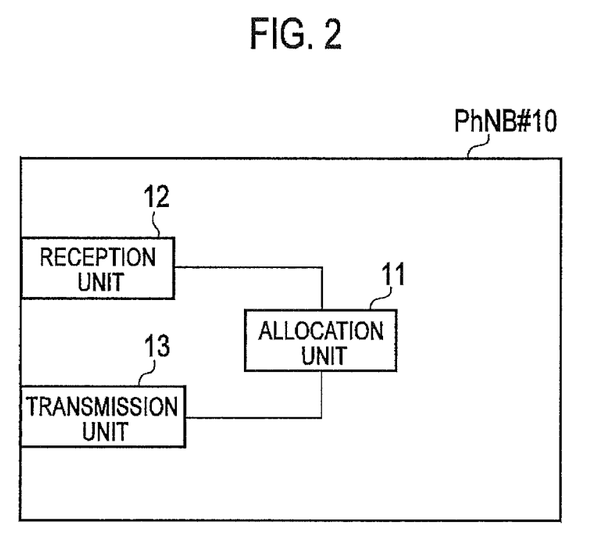
FIG. 2 is a functional block diagram of a radio base station PhNB#10 according to the first embodiment of the present invention.

As illustrated in FIG. 2, the radio base station PhNB#10 according to the present embodiment includes an allocation unit 11, a reception unit 12, and a transmission unit 13.

The allocation unit 11 is configured to allocate a same $C\text{-}RNTI_{ph}$ to the mobile stations UE#A to UE#D in the cell #10.

Here, the allocation unit 11 may allocate a same $C\text{-}RNTI_{ph}$ to a predetermined number of the mobile stations UE#A to UE#D in the cell #10.

In addition, the allocation unit 11 allocates an identifier different from a C-RNTI to each of the mobile stations UE#A to UE#D in the cell #10.

Such an identifier can identify each of the mobile stations UE#A to UE#D and be used in place of a UE-ID.

The reception unit 12 is configured to receive various kinds of signals from the mobile stations UE#A to UE#D in the cell #10 and the radio base stations eNB#1 to eNB#3. The transmission unit 13 is configured to transmit various kinds of signals to the mobile stations UE#A to UE#D in the cell #10 and the radio base stations eNB#1 to eNB#3.

Here, the transmission unit 13 notifies each of the mobile stations UE#A to UE#D in the cell #10 of a $C\text{-}RNTI_{ph}$ or an identifier, which is allocated by the allocation unit 11.

Also, the transmission unit 13 may notify the radio base stations eNB#1 to eNB#3 of the identifier allocated to each of the mobile stations UE#A to UE#D in the cell #10.

Figure 3:
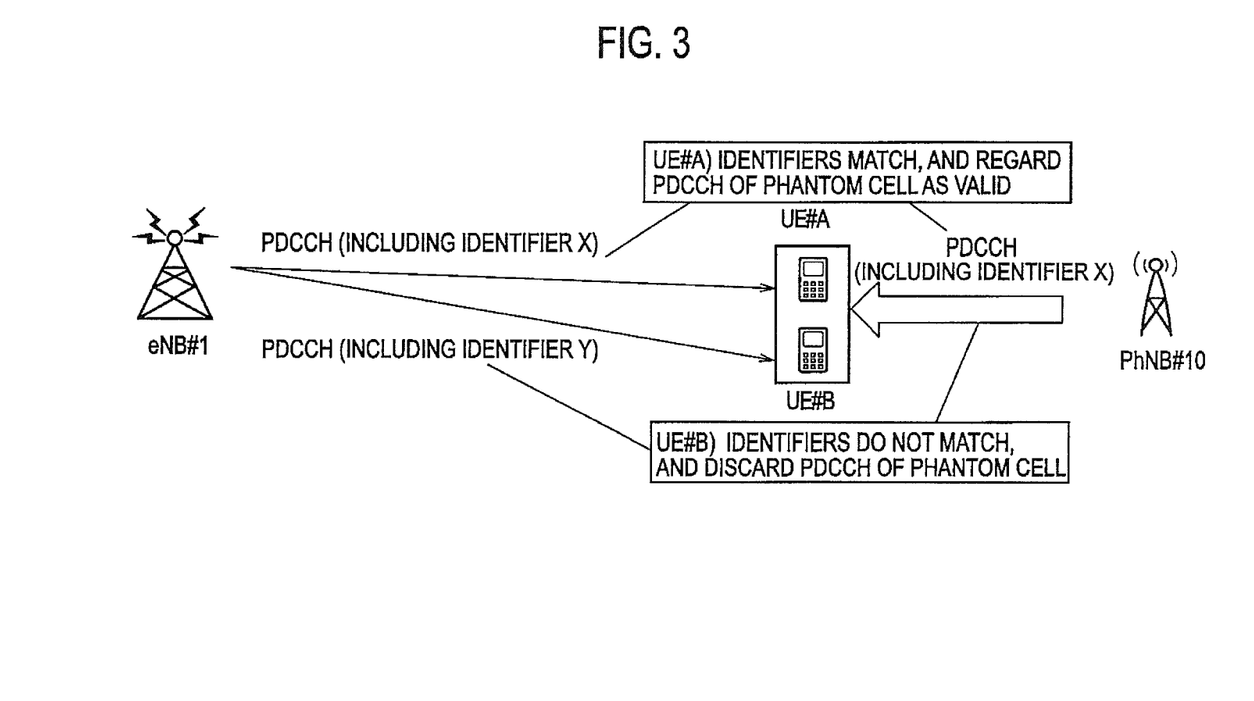
FIG. 3 is a diagram for illustrating operations of radio base stations PhNB#10/eNB#1 and mobile stations UE#A/UE#B according to the first embodiment of the present invention.

In addition, as illustrated in FIG. 3, the transmission unit 13 transmits a first control signal including a C-RNTI and identifier for each of the mobile stations UE#A to UE#D to each of the mobile stations UE#A to UE#D in the cell #10 through a PDCCH (Physical Downlink Control Channel).

Instead, the transmission unit 13 may transmit the first control signal including the C-RNTI and identifier for each of the mobile stations UE#A to UE#D through an ePDCCH (enhanced Physical Downlink Control Channel).

The configurations of the radio base stations eNB#1 to eNB#3 according to the present embodiment are basically same, and the description will be mainly given below to the configuration of the radio base station eNB#1.

Figure 4:
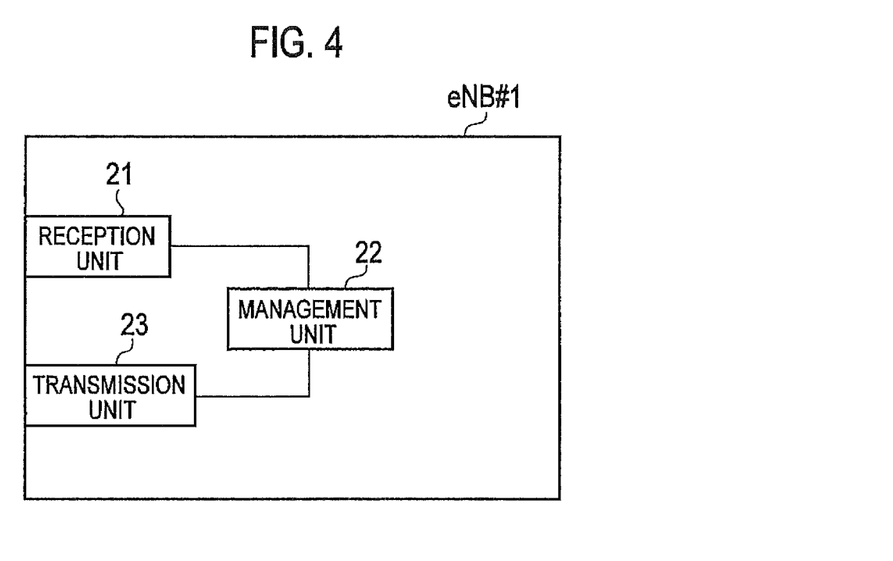
FIG. 4 is a functional block diagram of the radio base station eNB#1 according to the first embodiment of the present invention.

As illustrated in FIG. 4, the radio base station eNB#1 according to the present embodiment includes a reception unit 21, a management unit 22, and a transmission unit 23.

The reception unit 21 is configured to receive various kinds of signals from the mobile stations UE#A to UE#D and the radio base station PhNB#10.

For example, the reception unit 21 receives identifiers for the mobile stations UE#A to UE#D in the cell #10 from the radio base station PhNB#10.

The management unit 22 is configured to manage identifiers for the mobile stations UE#A to UE#D in the cell #10 which are received by the reception unit 21.

The transmission unit 23 is configured to transmit various kinds of signals to the mobile stations UE#A to UE#D and the radio base station PhNB#10.

For example, as illustrated in FIG. 3, the transmission unit 23 transmits a second control signal including an identifier for each of the mobile stations UE#A to UE#D to each of the mobile stations UE#A to UE#D in the cell #10 through the PDCCH.

Here, the second control signal may be a dummy control signal only for transmitting an identifier for each of the mobile stations UE#A to UE#D without allocation information and the like.

The configurations of the mobile stations UE#A to UE#D according to the present embodiment are basically same, and the description will be mainly given below to the configuration of the mobile station UE#A.

Figure 5:
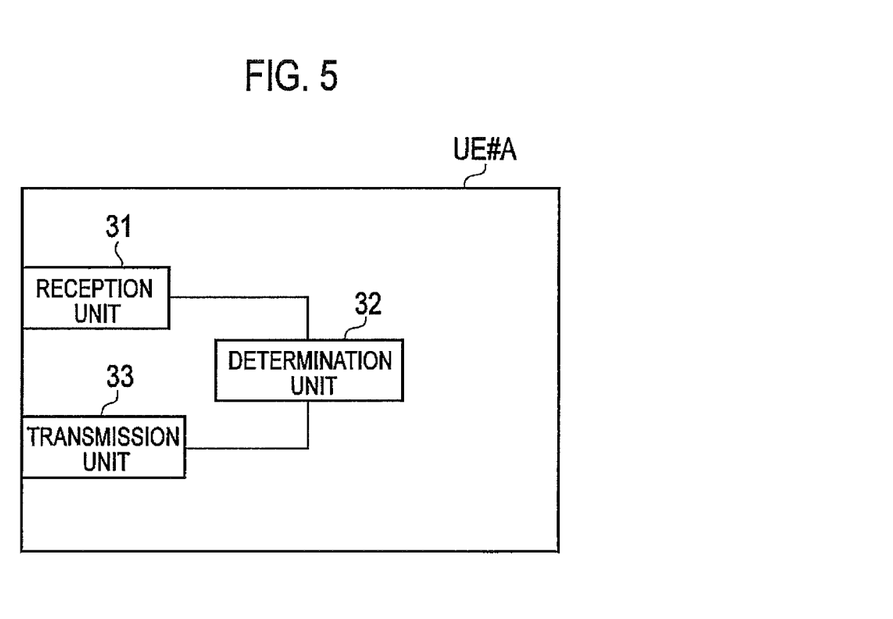
FIG. 5 is a functional block diagram of a mobile station UE according to the first embodiment of the present invention.

As illustrated in FIG. 5, the mobile station UE#A according to the present embodiment includes a reception unit 31, a determination unit 32, and a transmission unit 33.

The reception unit 31 is configured to receive various kinds of signals from the radio base stations PhNB#10/eNB#1/eNB#2/eNB#3. The transmission unit 33 is configured to transmit various kinds of signals to the radio base stations PhNB#10/eNB#1/eNB#2/eNB#3.

For example, the reception unit 31 receives a $C\text{-}RNTI_{ph}$ or identifier which is allocated to the mobile station UE through a dedicated signal from the radio base station PhNB#10.

Also, the reception unit 31 may receive a first control signal (for example, scheduling information) including an identifier for the mobile station UE through the PDCCH using the $C\text{-}RNTI_{ph}$ for the mobile station UE#A from the mobile station PhNB#10.

Furthermore, the reception unit 31 may receive a second control signal including the identifier for the mobile station UE#A through the PDCCH using the $C\text{-}RNTI_{ph}$ for the mobile station UE#A from the radio base stations eNB#1 to eNB#3.

The determination unit 32 is configured to determine whether or not the identifier included in the first control signal and the identifier included in the second control signal match each other or whether or not the second control signal corresponding to the first control signal is received.

Here, the description "the identifiers match each other" may mean that the same identifier is received or may be intended to mean that the identifiers associated with each other in advance are received.

Here, when determining that the identifier included in the first control signal and the identifier included in the second control signal match each other, the determination unit 32 regards the first control signal as valid.

In other words, in such a case, the transmission unit 33 transmits a data signal to the radio base station PhNB#10 through the PUSCH based on the first control information (scheduling information) received by the reception unit 31 (or may activate a random access procedure or the like instructed through the PDCCH).

Instead, in such a case, the reception unit 31 may receive data transmitted through the PDSCH based on the firs control information (scheduling information).

On the other hand, the determination unit 32 may discard or ignore the first control signal when determining that the identifier included in the first control signal and the identifier included in the second control signal do not match each other.

In addition, in such a case, the determination unit 32 may discard or ignore the second control signal.

Alternately, the determination unit 32 may discard or ignore the first control signal when the second control signal is not received after the first control signal is received.

In other words, in such a case, based on the first control information (scheduling information) received by the reception unit 31, the transmission unit 33 does not transmit a data signal to the radio base station PhNB#10 through the PUSCH or does not activate a procedure (for example, random access procedure) instructed by the first control information.

Also, in such a case, the reception unit 31 does not receive a data signal transmitted from the radio base station PhNB#10 through the PDSCH based on the first control information (scheduling information).

Furthermore, the determination unit 32 does not regard the second control signal received by the reception unit 31 as valid regardless of whether or not the identifier included in the first control signal and the identifier included in the second control signal match each other.

In other words, the transmission unit 33 does not transmit a data signal to the radio base station PhNB#10 through the PUSCH or does not activate a procedure (for example, random access procedure) instructed by the first control information, based on the second control information received by the reception unit 31.

Also, in such a case, the reception unit 31 does not receive the data signal transmitted from the radio base station PhNB#10 through the PDSCH based on the second control information.

In the example of FIG. 3, the mobile station UE#A determines that an identifier X included in the first control signal received from the radio base station PhNB#10 and an identifier X included in the second control signal received from the radio base station eNB#1 match each other and regards the first control signal as valid.

On the other hand, the mobile station UE#B determines that an identifier X included in the first control signal received from the radio base station PhNB#10 and an identifier X included in the second control signal received from the radio base station eNB#1 do not match each other, and discards the first control signal without regarding it as valid.

The features of the present embodiment may also be expressed as follows.

A first feature of the present embodiment is summarized as a mobile communication method, including the steps of : transmitting a first control signal including an identifier different from a C-RNTI (cell-specific identifier) to a mobile station UE#A through a PDCCH (physical downlink control channel) by a radio base station PhNB#10 (first radio base station) managing a cell #10 (phantom cell) formed by linking multiple small cells; transmitting a second control signal including an identifier to the mobile station UE through a PDCCH (physical downlink control channel) by a radio base station eNB#1 (second radio base station) managing a cell #1 (macro cell) having a coverage area overlapping with a coverage area of the cell #10; and regarding the first control signal as valid by the mobile station UE, when the mobile station UE determines that the identifier included in the first control signal and the identifier included in the second control signal match each other.

With the above-described configuration, even when a same $C\text{-}RNTI_{ph}$ is allocated to the multiple mobile stations UE#A to UE#D in the cell #10, each of the mobile stations UE#A to UE#D can determine whether or not the control signal is addressed to the mobile station UE itself by using the identifiers transmitted from the radio base station PhNB#10 and the radio base station eNB#1.

In the first feature of the present embodiment, the mobile communication method may include the step of discarding or ignoring at least one of the first control signal and the second control signal by the mobile station UE, when the mobile station UE determines that the identifier included in the first control signal and the identifier included in the second control signal do not match each other.

With the above-described configuration, each of the mobile stations UE#A to UE#D discards the control signal when determining that the control signal is not addressed to the mobile station UE itself. Thus, even when the same $C\text{-}RNTI_{ph}$ is allocated to the multiple mobile stations UE#A to UE#D in the cell #10, the radio base station PhNB#10 can transmit the control signal to a proper one of the mobile stations UE#A to UE#D.

In the first feature of the present embodiment, the mobile communication method may include the step of discarding the first control signal by the mobile station UE, when the mobile station UE does not receive the first control signal or the second control signal including the identifier included in the first control signal.

In the first feature of the present embodiment, the mobile station UE does not have to regard the second control signal as valid, regardless of whether or not the identifier included in the first control signal and the identifier included in the second control signal match each other.

With the above-described configuration, the radio base station eNB#1 can notify each of the mobile stations UE#A to UE#D in the cell #10 of the identifier with a minimum data amount without notifying needless information.

In the first feature of the present embodiment, the mobile station UE may determine whether or not the identifier included in the first control signal and the identifier included in the second control signal match each other when there is an instruction from the radio base station eNB.

In the first feature of the present embodiment, the mobile station UE may receive the first control signal or the second control signal including the identifier included in the first control signal in a cell designated by the radio base station eNB.

A second feature of the present embodiment is summarized as a mobile station UE capable of communicating with a radio base station PhNB#10 managing a cell #10 formed by linking multiple small cells and a radio base station eNB#1 managing a cell #1 having a coverage area overlapping with a coverage area of the cell #10, the mobile station UE including: a reception unit 31 configured to receive a first control signal including an identifier different from a C-RNTI from the radio base station PhNB#10 through a PDCCH and receive a second control signal including an identifier from the radio base station eNB#1 through a PDCCH; and a determination unit 32 configured to regard the first control signal as valid when determining that the identifier included in the first control signal and the identifier included in the second control signal match each other.

With the above-described configuration, even when the same $C\text{-}RNTI_{ph}$ is allocated to the multiple mobile stations UE#A to UE#D in the cell #10, each of the mobile stations UE#A to UE#D can determine whether or not the control signal is addressed to the mobile station UE itself, by using the identifiers transmitted from the radio base station PhNB#10 and the radio base station eNB#1.

In the second feature of the present embodiment, the determination unit 32 may discard or ignore at least one of the first control signal and the second control signal when determining the identifier included in the first control signal and the identifier included in the second control signal do not match each other.

With the above-described configuration, each of the mobile stations UE#A to UE#D discards the control signal, when determining that the control signal is not addressed to the mobile stations UE itself. Thus, even when the same $C\text{-RNTI}_{ph}$ is allocated to the multiple mobile stations UE#A to UE#D in the cell #10, the radio base station PhNB#10 can transmit the control signal to a proper one of the mobile stations UE#A to UE#D.

In the second feature of the present embodiment, the determination unit 32 may discard the first control signal when the first control signal or the second control signal including the identifier included in the first control signal is not received.

In the second feature of the present embodiment, the determination unit 32 does not have to regard the second control signal as valid regardless of whether or not the identifier included in the first control signal and the identifier included in the second control signal match each other.

With the above-described configuration, the radio base station eNB#1 can notify each of the mobile stations UE#A to UE#D in the cell #10 of the identifier with a minimum data amount without notifying needless information.

In the second feature of the present embodiment, the determination unit 32 may determine whether or not the identifier included in the first control signal and the identifier included in the second control signal match each other when there is an instruction from the radio base station eNB.

In the second feature of the present embodiment, the determination unit 32 may receive the first control signal or the second control signal including the identifier included in the first control signal in a cell designated by the radio base station eNB.

Also, the collision avoiding control described above needs to be performed only when assignment is simultaneously made (the scheduling information is transmitted) to the mobile stations UE to which the same identifier is allocated in the same cell, and does not need to be always performed.

In other words, the mobile station UE may perform the collision avoiding control as described above only when an instruction to perform such control is issued by the radio base station eNB.

The designation may be performed in any layer of the RRC layer, PDCP layer, RLC layer, MAC layer, and physical layer. In particular, the designation may be notified together with the first control signal or may be notified together with the second control signal.

Furthermore, in the above description, a cell to transmit the second control signal is described as a macro cell, but the second control signal may be received by any cell in which a mobile station UE is set.

It should be noted that the foregoing operations of the mobile stations UE#A to UE#D and the radio base stations eNB#1/eNB#2/eNB#3/PhNB#10 maybe implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. Such an ASIC may be provided in the mobile stations UE#A to UE#D and the radio base stations eNB#1/eNB#2/eNB#3/PhNB#10. Otherwise, the storage medium and the processor may be provided as discrete components inside the mobile stations UE#A to UE#D and the radio base stations eNB#1/eNB#2/eNB#3/PhNB#10.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-188687(filed on Aug. 29, 2012) is incorporated by reference in the present specification.

INDUSTRIAL APPLICABILITY

As described above, the present invention can provide a mobile communication method and a mobile station, in which a collision between mobile stations UE#A to UE#D to which a same C-RNTI is allocated can be avoided even when the same C-RNTI is allocated to the multiple mobile stations UE#A to UE#D in a phantom cell.

EXPLANATION OF REFERENCE NUMERALS eNB#1, eNB#2, eNB#3, PhNB#10 radio base station
11 allocation unit
12, 21, 31 reception unit
13, 23, 33 transmission unit
22 management unit
32 determination unit

The invention claimed is:

1. A mobile communication method, comprising the steps of:
    transmitting a first control signal including an identifier different from a cell-specific identifier to a mobile station through a physical downlink control channel by a first radio base station managing a cell formed by linking a plurality of small cells;
    transmitting a second control signal including an identifier to the mobile station through a physical downlink control channel by a second radio base station managing a macro cell having a coverage area overlapping with a coverage area of the cell; and
    regarding the first control signal as valid by the mobile station, when the mobile station determines that the identifier included in the first control signal and the identifier included in the second control signal match each other.

2. The mobile communication method according to claim 1, comprising the step of discarding at least one of the first control signal and the second control signal by the mobile station, when the mobile station determines that the identifier included in the first control signal and the identifier included in the second control signal do not match each other.

3. The mobile communication method according to claim 1, further comprising the step of discarding the first control signal by the mobile station, when the mobile station does not receive the second control signal corresponding to the first control signal or the second control signal including the identifier included in the first control signal.

4. The mobile communication method according to claim 1, wherein the mobile station does not regard the second control signal as valid, regardless of whether or not the identifier included in the first control signal and the identifier included in the second control signal match each other.

5. The mobile communication method according to claim 1, wherein the mobile station determines whether or not the identifier included in the first control signal and the identifier included in the second control signal match each other when there is an instruction from the second radio base station.

6. The mobile communication method according to claim 1, wherein the mobile station receives the second control signal corresponding to the first control signal or the second control signal including the identifier included in the first control signal in another cell designated by the second radio base station.

7. A mobile station capable of communicating with a first radio base station managing a cell formed by linking a plurality of small cells and a second radio base station managing a macro cell having a coverage area overlapping with a coverage area of the cell, the mobile station comprising:

a receiver that receives a first control signal including an identifier different from a cell-specific identifier from the first radio base station through a physical downlink control channel and receives a second control signal including an identifier from the second radio has station through a physical downlink control channel; and a processor that regards the first control signal as valid when determining that the identifier included in the first control signal and the identifier included in the second control signal match each other.

8. The mobile station according to claim 7, wherein the processor discards at least one of the first control signal and the second control signal when determining the identifier included in the first control signal and the identifier included in the second control signal do not match each other.

9. The mobile station according to claim 7, wherein the processor discards the first control signal when the second control signal corresponding to the first control signal or the second control signal including the identifier included in the first control signal is not received.

10. The mobile station according to claim 7, wherein the processor does not regard the second control signal as valid regardless of whether or not the identifier included in the first control signal and the identifier included in the second control signal match each other.

11. The mobile station according to claim 7, wherein the processor determines whether or not the identifier included in the first control signal and the identifier included in the second control signal match each other when there is an instruction from the second radio base station.

12. The mobile station according to claim 7, wherein the processor receives the second control signal corresponding to the first control signal or the second control signal including the identifier included in the first control signal in another cell designated by the second radio base station.

* * * * *